United States Patent [19]

Chao

[11] Patent Number: 5,381,407
[45] Date of Patent: Jan. 10, 1995

[54] METHOD AND SYSTEM FOR CONTROLLING USER TRAFFIC TO A FAST PACKET SWITCHING SYSTEM

[75] Inventor: Hung-Hsiang J. Chao, Lincroft, N.J.

[73] Assignee: Bell Communications Research, Inc., Livingston, N.J.

[21] Appl. No.: 893,274

[22] Filed: Jun. 4, 1992

[51] Int. Cl.⁶ .......................... H04J 3/14; H04Q 11/04
[52] U.S. Cl. ...................................... 370/60; 370/94.1
[58] Field of Search ................. 370/58.1, 60, 60.1, 370/61, 85.1, 85.5, 91, 94.1, 92, 94.2, 95.1, 17, 93, 58.2, 58.3; 340/825.5, 825.51, 825.52, 825.06, 825.07

[56] References Cited

U.S. PATENT DOCUMENTS

| | | | |
|---|---|---|---|
| 4,991,172 | 2/1991 | Cidon et al. | 370/60 |
| 5,042,029 | 8/1991 | Hayakawa | 370/60 |
| 5,050,162 | 9/1991 | Golestani | 370/60 |
| 5,050,163 | 9/1991 | Van Bavel | 370/94.1 |
| 5,079,762 | 1/1992 | Tanabe | 370/94.1 |
| 5,128,932 | 7/1992 | Li | 370/60 |
| 5,179,556 | 1/1993 | Turner | 370/94.1 |
| 5,179,557 | 1/1993 | Kudo | 370/94.1 |
| 5,253,247 | 10/1993 | Hirose et al. | 370/94.1 |

OTHER PUBLICATIONS

L. Zhang, "VirtualClock: A new traffic control algorithm for packet switching networks," in Proc. SIG-COMM '90, Philadelphia, Pa., Sep. 1990, pp. 19-29.
J. S. Turner, "New directions in communications (or which way to the information age?)" IEEE Commun. Mag., vol. 24, No. 10, pp. 8-15, Oct. 1986.

Primary Examiner—Douglas W. Olms
Assistant Examiner—Huy D. Vu
Attorney, Agent, or Firm—Leonard Charles Suchyta; Joseph Giordano

[57] ABSTRACT

A method and system are provided for controlling user traffic to a fast packet switching system using the leaky bucket scheme. Each of the packets (53 byte length cell) originates at a source of packets and has a virtual channel identifier (VCI). The method includes the step of receiving the packets, each of the packets having associated therewith an arrival time. The packets are stored at an addressable location in a first memory. The first memory having a plurality of addressable locations. In a second memory, there are stored addresses corresponding to the addressable locations in the first memory in which a packet is not yet stored. The addresses stored in the second memory are utilized in the step of storing the received packets. A credit manager circuit determines whether a stored packet complies with predetermined traffic parameters such as average arrival rate and maximum burst rate. This determination is based on a packet's arrival time and its VCI to obtain a validated packet. The credit manager circuit retrieves the validated packet from the first memory and the retrieved packet is then transmitted to the packet switching system.

10 Claims, 8 Drawing Sheets p : probability of being the last cell in a burst
q : probability of starting a new burst in each time slot (I)

(II)

(III)

(IV)

METHOD AND SYSTEM FOR CONTROLLING USER TRAFFIC TO A FAST PACKET SWITCHING SYSTEM

CROSS-REFERENCE TO RELATED APPLICATIONS

This application is related to U.S. patent applications entitled "Method and System for Managing a Queue" and filed on the same date as the present application by the present assignee and "Sequencer Chip Device" also filed by the present assignee and which is hereby expressly incorporated by reference in its entirety.

1. Technical Field

This invention relates to methods and systems for controlling user traffic to fast packet switching systems and, in particular, to methods and systems for controlling user traffic to fast packet switching systems utilizing a leaky bucket scheme.

2. Background Art

Broadband integrated service digital networks (B-ISDN) provide end-to-end transport for a wide range of broadband services flexibly and efficiently via the asynchronous transfer mode (ATM) technique. Information is packetized and carried in fixed length "cells," which may then be statistically multiplexed with other traffic into the payload of an STS-3c channel (about 150 Mbit/s). Due to the natural burstiness of the broadband traffic, congestion control is required to effectively and fairly allocate the shared network resources such as transmission bandwidth and buffer capacity in a manner that provides satisfactory grade-of-service (GOS) for all network users with acceptable implementation costs. Traffic from users may need to be monitored and enforced to comply with traffic parameters that could be established at the time of its admission to the ATM network. These parameters may include average and peak bit rates, and maximum burst lengths. If the user does not conform to the parameters, actions must be taken for the violated traffic. For example, a multi-layered congestion control at call, burst and cell layer has been proposed in order to properly cope with traffic characteristics.

A suitable set of congestion controls for broadband networks may include features for admission control, buffer and queue management, traffic enforcement, and reactive control. Admission controls decide whether a new virtual channel (VC) connection should be admitted to the network based on the knowledge of the current network status (e.g. loading and available resources) and performance objectives such as cell loss probability, cell transfer delay and cell delay variation. Queue management algorithms will manage the queued cells in such a way that higher priority cells will always be served first, the low priority cells will be dropped when the queue is full, and within the same priority any interference is prevented. A novel architecture to implement the queue management can be found in the above noted application entitled "Method and System for Managing a Queue."

Traffic enforcement monitors (or polices) each individual virtual connection to ensure that its traffic flow into the network conforms to traffic parameters such as average and peak bit rates, and maximum burst lengths that are specified at call set-up time. If the connection does not conform to the parameters, some actions will be taken for the violated traffic. The purpose of reactive control is to relieve congestion in the networks, once it has occurred, by immediately sending back status information to the source nodes and instructing them to throttle back their traffic flows. However, because of the large propagation delay (e.g. 5 ms per 1,000 km) compared with queue time constants (e.g. 500 $\mu$s per switch nominal node delay), many cells will be still in transit and may either be lost or in violation of delay specifications by the time the source nodes receive the congestion information and regulate their traffic flows.

From the above discussion, it is clear that an ATM-based network needs an effective congestion control mechanism to prevent the network from being overloaded. FIG. 1 shows one architecture where the traffic from users is monitored and enforced to comply with the traffic parameters established at the time of its admission to the ATM network. The objective of traffic enforcement is to protect other connections by assuring that network resources are not consumed by any connection which violates the negotiated parameters. The traffic enforcement function must belong to the public ATM network, but its location should be as close as possible to the traffic source or user (i.e. at the user-network interface) so that the control actions can take effect rapidly.

The pattern of the traffic (e.g. burst length) arriving at the traffic enforcement device may be different from that generated by the terminal equipment because a statistical multiplexing function may be performed in a customer premises network. The terminal equipment may choose to implement access controls, for instance, by "shaping" its traffic with a sufficiently large buffer to better meet the traffic parameters. From the network point of view, it only cares about what the traffic pattern is at the ingress or the egress edge of the public network but not at the terminal locations.

The most common traffic enforcement method is the so-called "leaky bucket," or rate-based window scheme as discussed in J. S. Turner "New Directions In Communications (Or Which Way To The Information Age?)" IEEE COMMUN. MAG. Vol. 24, No. 10, pp. 8–15, October 1986. Leaky bucket is a simple open-loop control scheme, involving only local actions and no real-time coordination between network components.

SUMMARY OF THE INVENTION

An object of the present invention is to provide a method and system for controlling user traffic to a fast packet switching system utilizing a leaky bucket scheme.

In carrying out the above object and other objects of the present invention, a method is provided for controlling user traffic to a fast packet switching system. Each of the packets originates at a source of packets and has a virtual channel identifier (VCI). The method includes the step of receiving the packets. Each of the packets have associated therewith an arrival time. The method also includes the step of storing each of the received packets at an addressable location in a first memory. The first memory has a plurality of addressable locations. The method further includes the step of storing in a second memory addresses corresponding to the addressable locations in the first memory in which a packet is not yet stored. The addresses stored in the second memory are utilized in the step of storing the received packets. Then the method includes the step of determining whether a stored packet complies with predetermined traffic parameters based on its arrival time and its VCI to obtain a validated packet, then the validated packet is retrieved from the first memory and transmitted to the packet switching system.

Preferably, the predetermined traffic parameters include average arrival rate and maximum burst rate.

A system is also provided for carrying out each of the above method steps.

The above objects and other objects, features, and advantages of the present invention are readily apparent from the following detailed description of the best mode for carrying out the invention when taken in connection with the accompanying drawings.

DETAILED DESCRIPTION OF THE INVENTION

OVERVIEW

The present application discloses four versions of the leaky bucket scheme and compares their cell loss performance in conjunction with a statistical multiplexer (in the section entitled "Different Versions of Leaky Bucket Schemes"). Based on the version with best performance, three architectures are disclosed. The first two architectures (in the section entitled "Possible Architectures For The Leaky Bucket Scheme") are intermediate architectures that suffer some implementation constraints and can only handle a small number of virtual connections (VCs, e.g. about 100) on the incoming channel. However, since the leaky bucket function has to be performed for each VC and there may be a large number of active connections (e.g. 2K) on each STS-3c channel, a third architecture capable of handling a large number of connections is disclosed. This architecture, together with a novel algorithm and its method of implementation, is disclosed (in the section entitled "Proposed Architecture/Algorithm For Large Number Of Virtual Channels"). Conclusions are also disclosed.

DIFFERENT VERSIONS OF LEAKY BUCKET SCHEME

Figure 2:
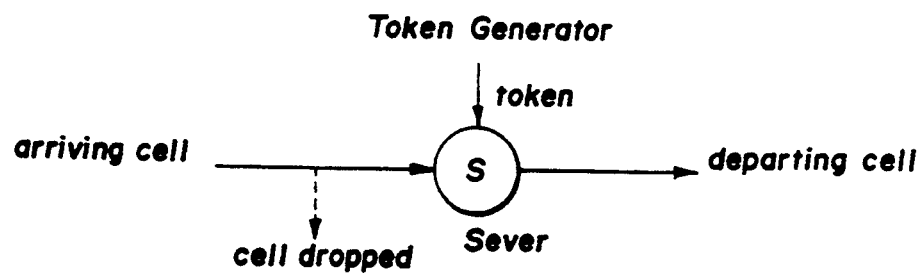
FIG. 2(i through iv) is a schematic view illustrating four different versions of the leaky bucket scheme.
Figure 2:
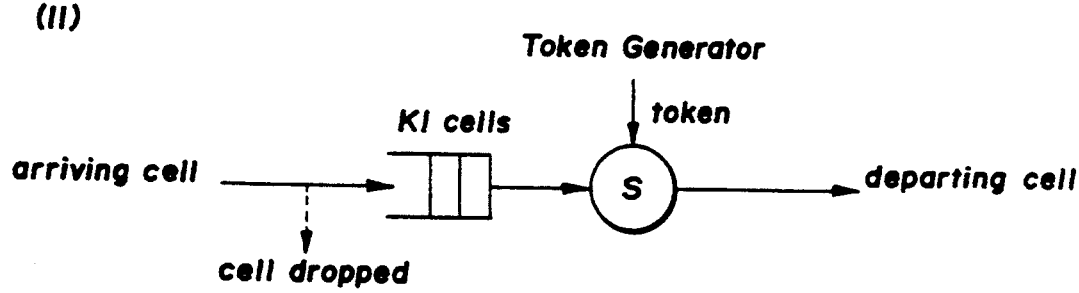
Figure 2:
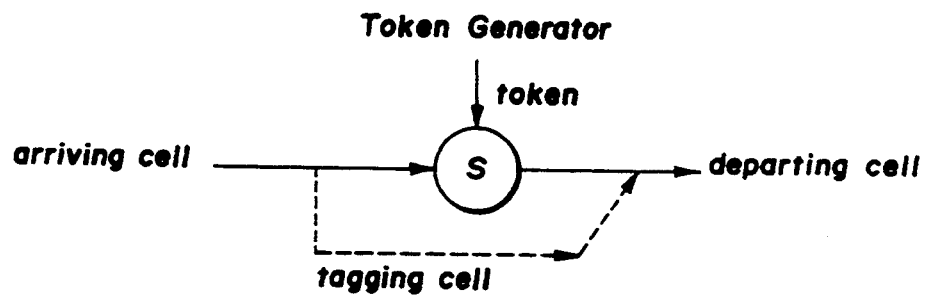
Figure 2:
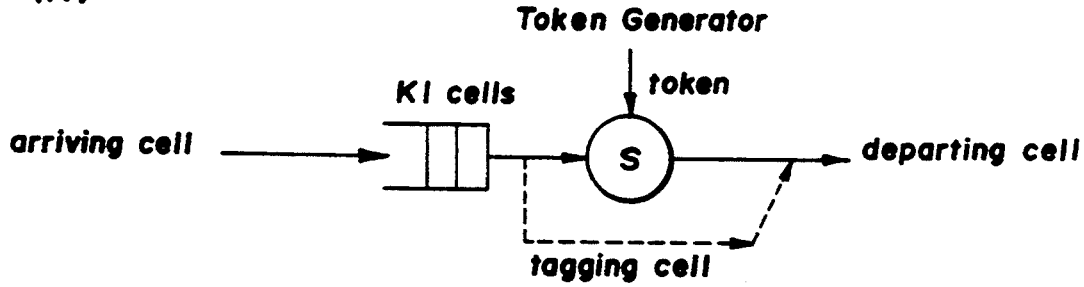

Depending on what enforcement action is taken and whether or not there is a "shaping" buffer, four different versions of the leaky bucket scheme are summarized in FIG. 2. Regardless of which version it is, there is always a server to determine whether or not the incoming cell could immediately be sent out based on its current "token" count (or credit). The token count can be, for example, incremented periodically with the average arrival rate or a rate that is slightly higher than this rate. Usually this token count has a maximum limit, similar to the "credit line" in the bank credit account. The number of permissible transmitted cells in a burst (or monthly total expense, in the bank analogy) cannot exceed this predetermined value. When there is no token, the newly arriving cell will be either dropped (Scheme I), or temporarily stored in a shaping buffer with a size of K1 cells and waiting for a token to be generated before being sent out (Scheme II), or transmitted to the output channel anyway except that the cell is tagged with a lower priority (Scheme III). This implies that some sort of priority mechanism has to be implemented within the network. In Scheme II, when the buffer is full, the newly arriving cell will be discarded if the server does not have any tokens. Alternatively, the newly arriving cell can be stored in the full buffer after a queued cell in the buffer has been chosen, tagged with a lower priority and sent out (Scheme IV). These four leaky bucket schemes will later be compared in terms of cell loss performance and Scheme IV is shown to have the best performance. Therefore, the architecture designs presented in this paper are based on Scheme IV.

There is some doubt between advantages of the enforcement actions: immediately discarding excess cells or tagging them. The disadvantage of tagging cells is that the GOS cannot be guaranteed if somewhere on the connection path congestion occurs and these tagged cells are dropped. Besides, the advantages of tagging cells, increasing the network throughout and decreasing cell loss rate, can also be achieved by "pretagging" cells with a lower priority indication according to their tolerances to loss (e.g. cells carrying information for different frequency bands in a video codec). However, cell tagging is promoted because violation-tagging is "softer" than immediately discarding in that depending on the network congestion conditions, very few tagged cells may actually be discarded in the network. In addition, the traffic parameters agreed upon at the call set-up time may be relaxed, allowing more marging for false alarms, i.e., incorrectly identifying non-violated cells to violated cells.

Besides the limitation on the maximum number of cells that can be sent in a burst, there is also a restriction on the transmission peak rate. If cells arrive at a rate exceeding the allowed peak rate (in other words, their inter-arrival interval is less than a predetermined value), they will have to be discarded or buffered even if they may have tokens. The buffer in the leaky bucket device will not only smooth traffic's burstiness but also reduce its transmission peak rate. However, adding this buffer increases implementation complexity considerably, especially when the number of virtual connections on the incoming channel becomes large. When cells are stored in the buffer either because of the lack of tokens or to limit the transmission peak rate, proper scheduling and timely delivery are not trivial and may become the system's bottlenecks. A simple first-in-first-out discipline will not be able to handle this correctly. Therefore, the design of a feasible and flexible architecture independent of the number of the virtual connections or the buffer size is very challenging and is the primary subject matter of the present application.

SIMULATION METHODS

Figure 1:
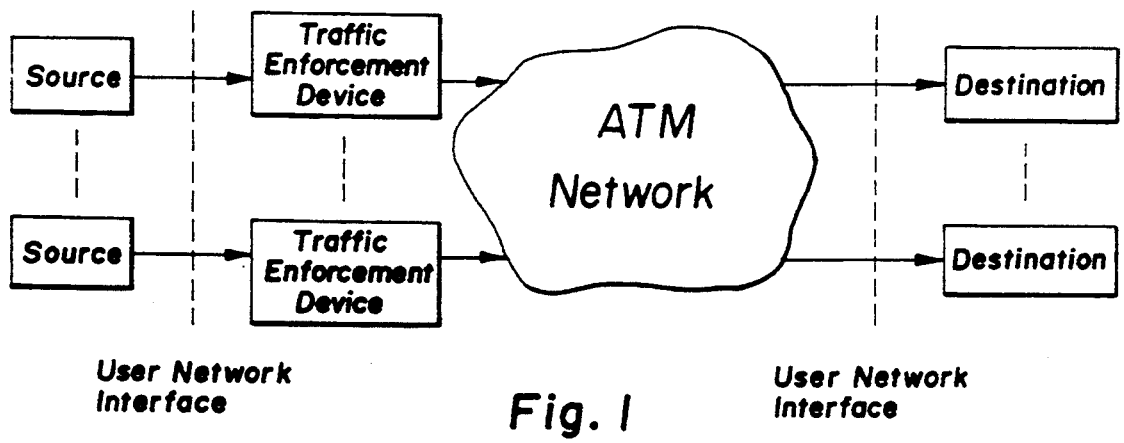
FIG. 1 is a schematic view illustrating traffic enforcement in the ATM network; users' traffic is monitored and enforced to follow traffic parameters such as average and peak bit rates, and the maximum burst length.
Figure 3A:
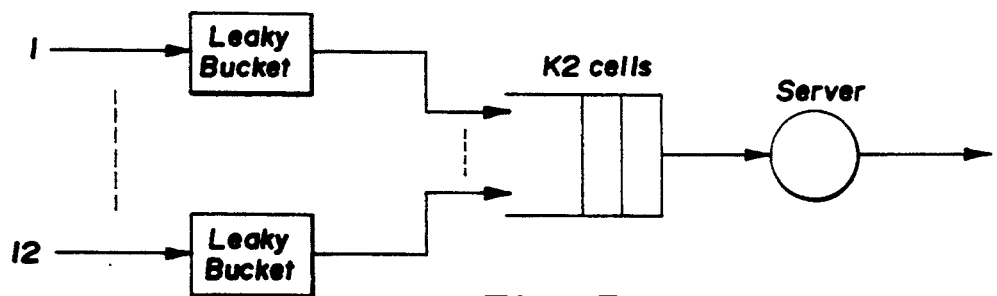
FIGS. 3a and 3b are schematic views illustrating a simulated system and source traffic model, respectively.
Figure 3B:
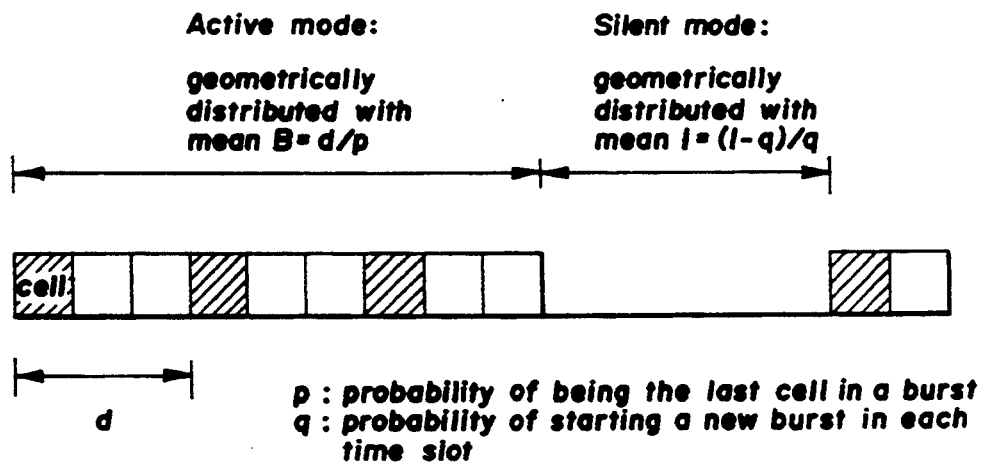

The simulation model in FIG. 3 shows that 12 independent input channels are monitored and enforced by one of the leaky bucket schemes in FIG. 2. They are then statistically multiplexed (e.g. at the network's first node) into an output channel that has the same bandwidth capacity as each of the inputs. A similar simulation model has also been employed by G. Gallassi, B. Rigolio, and L. Fratta in the paper entitled "ATM: Bandwidth Assignment and Bandwidth Enforcement," IEEE GLOBECOM '89, Dallas, Tex., pp. 1788–1793, November 1989. Cells passing through the leaky bucket devices are stored in a multiplexer queue with a size of K2 cells and a fixed-rate server will send out a cell at every time slot if the queue is not empty.

Although the traffic models used herein are relatively simple and may not truly represent any B-ISDN service, the simulation results could still be qualitatively applied to other more specific and practical source models.

For example, it is assumed that the traffic source model from each input alternates between active and silent modes as shown in FIG. 3, which is called a discrete-time interrupted Poisson process (IPP) and has been considered to be suitable to describe bursty traffic in ATM networks.

Another similar but more sophisticated model that is closer to real traffic has been proposed recently. During a silent mode, no cells are generated and during an active mode, cells are produced periodically with a period of d cells. The length of the active and silent periods are geometrically distributed with an average length of B and I, respectively. If p= the probability of a cell that is the last cell in a burst (in active mode) and q= the probability of starting a new burst per time slot, then the probability that the burst has i cells is:

$$P(i)=(1-p)^{(i-1)}p, \ i \geq 1$$

The probability that an idle period lasts for j time slots is:

$$Q(j)=(1-q)^j q, \ j \geq 0$$

Thus, the mean number of cells in a burst and the mean idle length will be:

$$B/d = \sum_{i=1}^{\infty} iP(i) = 1/p$$

$$I = \sum_{j=0}^{\infty} jQ(j) = (1-q)/q$$

The offered load ($\rho$) from each input is equal to (B/d)/(B+1). Therefore, for a given p, a mean burst length B and the period in the active mode d,q can be found to be:

$$q = \left[ B\left(\frac{1}{d\rho} - 1\right) + 1 \right]^{-1}$$

SIMULATION RESULTS

Figure 4:
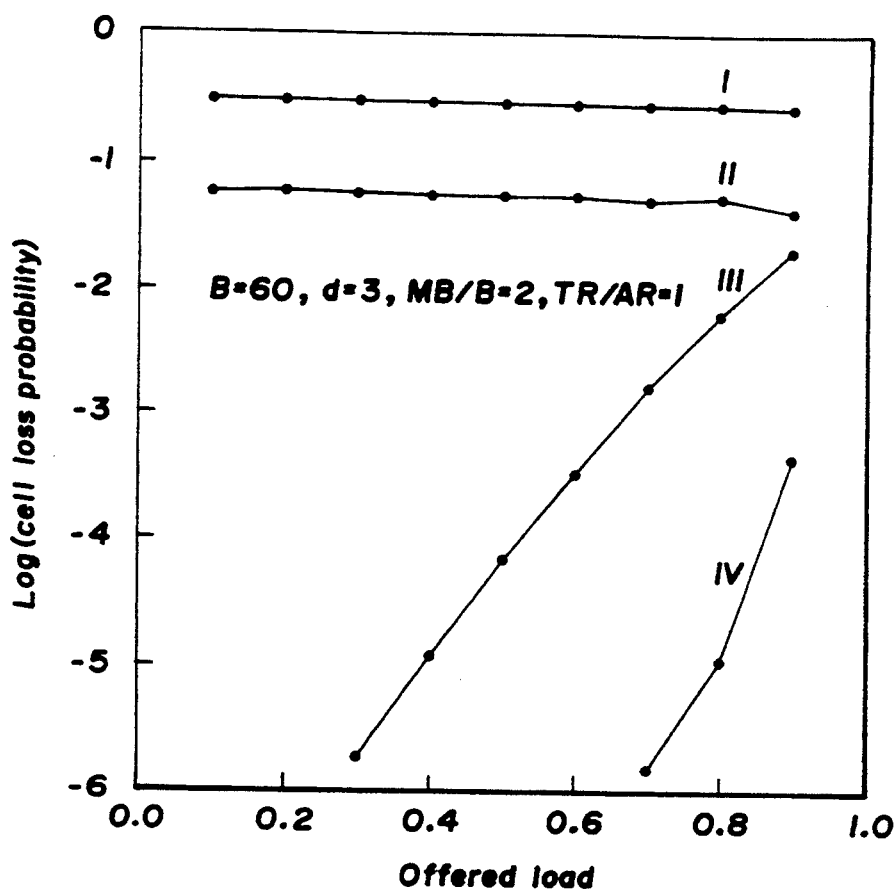
FIG. 4 is a graph illustrating cell loss probability versus offered load.

To study the cell loss rate of four different leaky bucket schemes, the model in FIG. 3 was simulated on several computers to reduce the simulation time. FIG. 4 shows that the cell loss probability increases as the total offered load increases. In this simulation, the input's mean burst length (B) was arbitrarily chosen to be 60 cells, the period in the active mode (d) to be 3 cells to reflect more closely the SMDS (switched multi-megabit data service) traffic, the maximum allowed burst length (MB) to be twice B (except in FIG. 6), and the token generation rate (TR) to be equal to the average arrival rate (AR) (except in FIG. 7). Finding optimal values for MB and TR was not the major goal. The cell loss probability of both Schemes I and II in FIG. 4 are insensitive to the load variation because all lost cells result from the violation of the maximum allowed burst length (MB) and are discarded at the leaky bucket device before reaching the statistical multiplexer. It is also observed that the probability that the shaping buffer is full is less than 6%, and that the cells discarded at the multiplexer queue for Schemes III and IV are all tagged.

Therefore, it can be concluded that the buffer indeed provides some traffic shaping capability (smoothing long bursts) and the operation of tagging cells reduces cell loss probability. The simulation results show that tagging cells (Scheme III) has better performance than shaping traffic (Scheme II). However, if somewhere along the connection congestion occurs, tagged cells may be discarded due to their lower priority relative to untagged cells. Thus, if more statistical multiplexers are cascaded, the advantage of tagging cells will not be as obvious as the data shown in FIG. 4. Nevertheless, based on the simulation results shown in FIG. 4 to FIG. 7, the performance of Scheme IV (shaping traffic and tagging cells) is the best of the four schemes considered.

Figure 5:
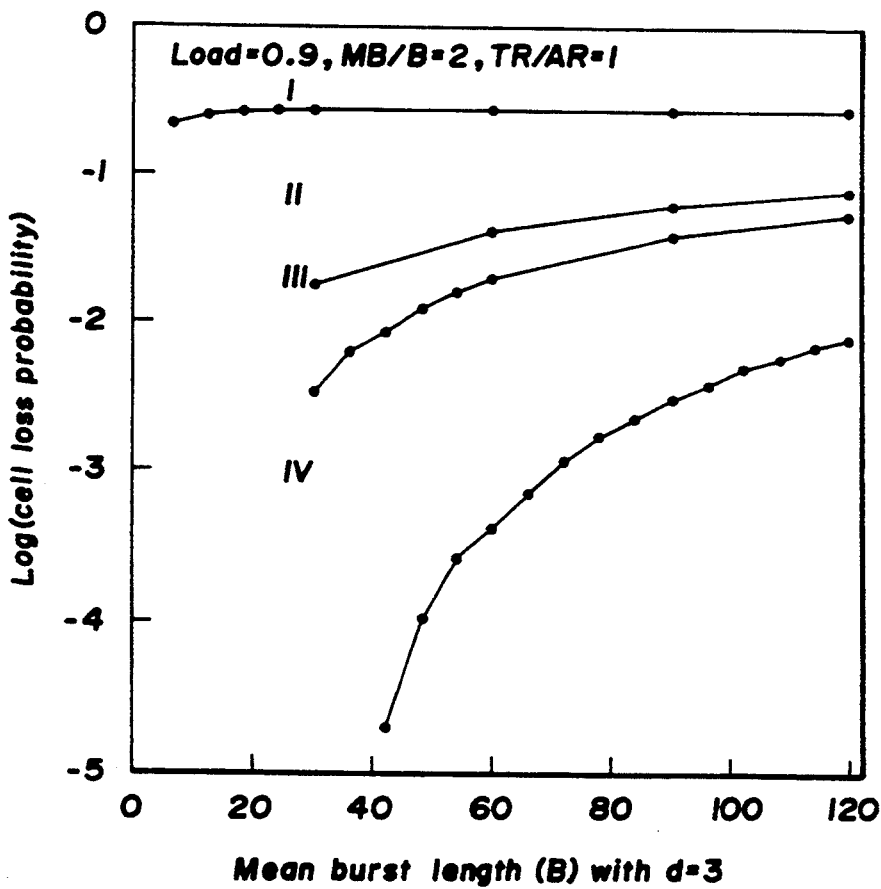
FIG. 5 is a graph illustrating cell loss probability versus mean burst length.

FIG. 5 shows that the cell loss probability of four leaky bucket schemes increases as the inputs' mean burst length increases.

Figure 6:
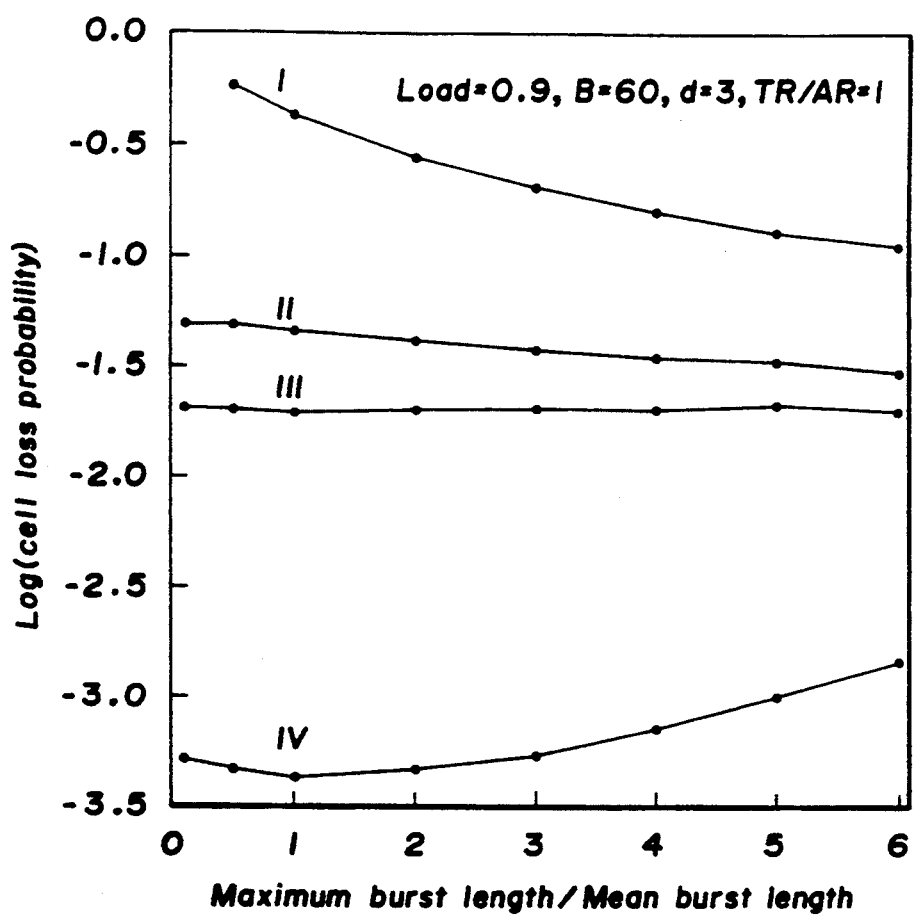
FIG. 6 is a graph illustrating how cell loss probability varies as the maximum burst length changes.

FIG. 6 shows the relationship of cell loss probability and the maximum allowed burst length (MB). As MB increases, the percentage of cells that are shaped by the buffer is reduced and hence, more cells are tagged and dropped when arriving at the multiplexer queue. It can be extrapolated that as MB continues increasing, the advantage of using the buffer in the leaky bucket device will decrease and eventually its cell loss rate will be the same as that with no shaping buffer, i.e. Scheme II's results approach Scheme I's and Scheme IV's approach III's. In FIG. 6, the ratio of MB/B equal to one provides the best cell loss performance. However, if conditions such as the offered load, the buffer and queue sizes, or the MB changes, it may not provide the optimal result.

Figure 7:
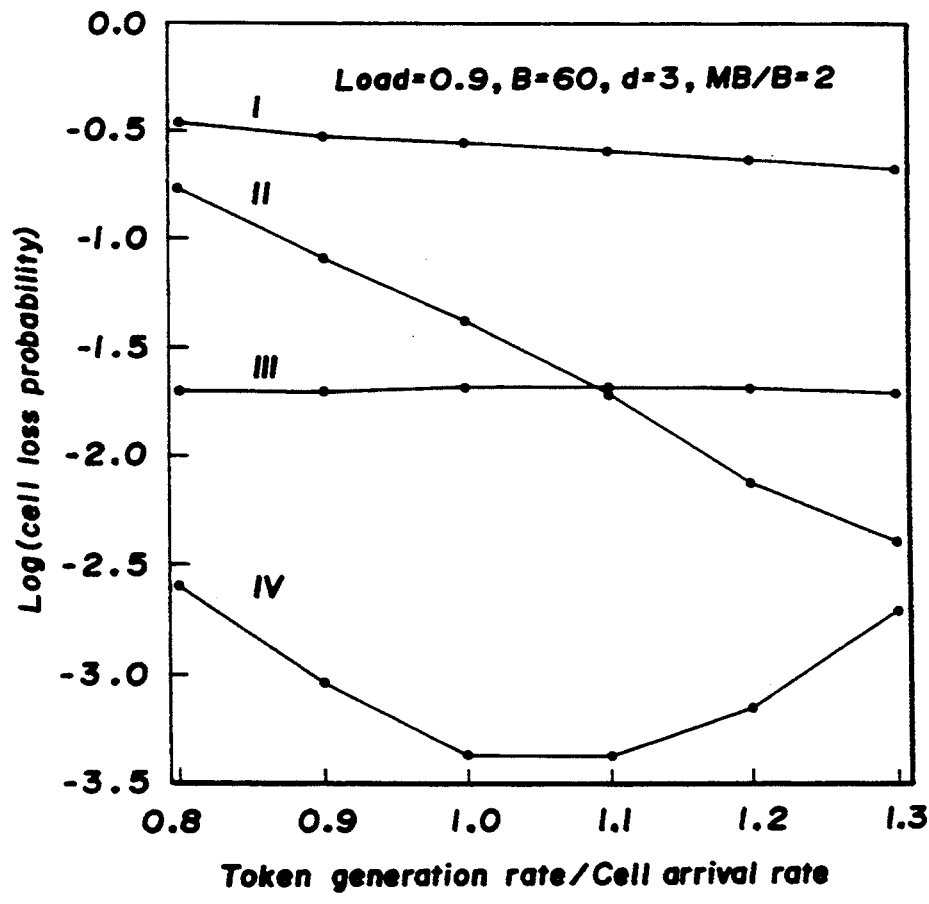
FIG. 7 is a graph illustrating cell loss probability versus token generation rate over cell arrival rate.

From FIG. 7, it can be seen that the cell loss probability for both Schemes I and II drops as the token generation rate (TR) increases. As the TR increases, fewer cells are discarded at the first buffer and so they have more opportunities to compete with others and survive at the multiplexer queue. The cell loss probability of Scheme III is independent of the token generation rate because its violated cells are always sent (with a tag) to a multiplexer queue anyway. Again, as in the previous discussion, the ratio of TR/AR equal to 1.1 for Scheme IV may not offer the best result if other parameters vary, although it does in this case.

POSSIBLE ARCHITECTURE FOR THE LEAKY BUCKET SCHEME

Two possible architectures to implement the leaky bucket scheme IV are described hereinbelow. They are described in an order that follows the procedure of generating the final proposed architecture (described in the next Section) although they are intermediate architectures that suffer some implementation constraints. In addition, they only police two traffic parameters—average arrival rate and maximum burst length. If the transmission peak rate is to be monitored and enforced as well, a second leaky bucket device will have to be cascaded with the first one (so-called dual leaky bucket). The proposed algorithm/architecture (the third one in this specification) takes all three traffic parameters into consideration together and so its hardware implementation is simpler and less expensive.

Figure 8:
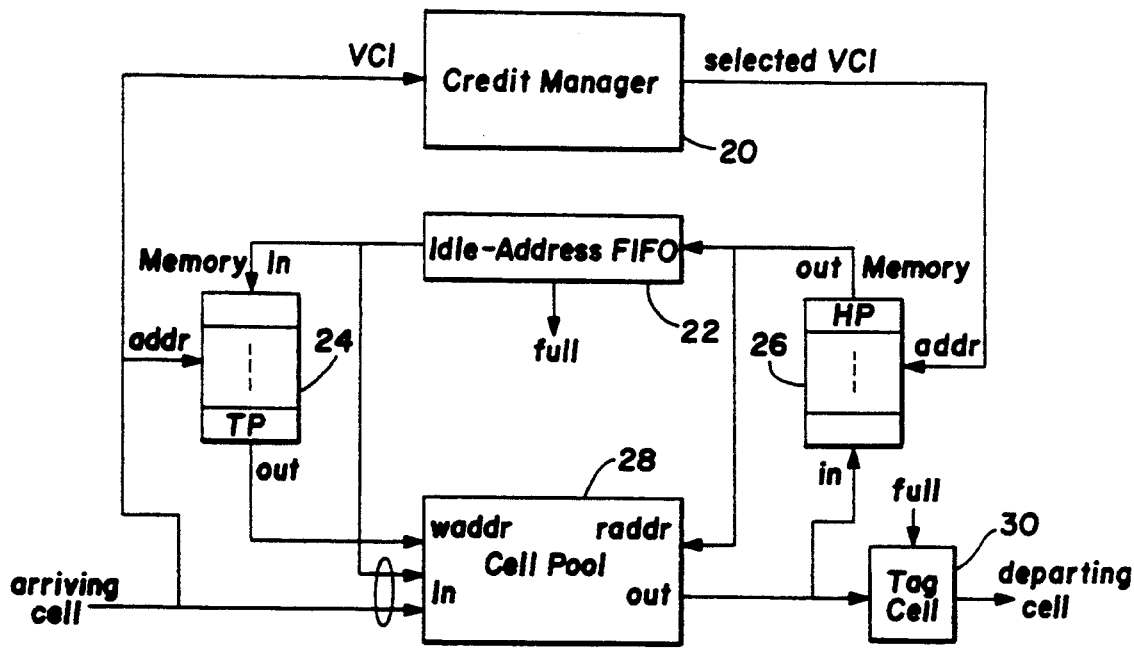
FIG. 8 is a block diagram for the first or second architecture of the present invention; each logical queue associated with its VCI is represented by two pointers—head and tail pointers.

FIG. 8 shows the first architecture, which consists of a credit manager 20, an idle-address FIFO 22, two pointer memories 24 and 26, a cell pool 28 and a tag-cell circuit 30. Upon a cell arrival, it will be stored in the cell pool 28 if the cell pool 28 is not full. If it is full, a cell in the cell pool 28 will immediately be chosen, tagged by the tag-cell circuit 30 and sent out. The vacant cell position will then be filled by the newly arriving cell. Cells that have the same virtual channel identifier (VCI) are linked in an identical logical queue stored in the cell pool 28. The logical queue's starting and ending addresses are two pointers: head and tail pointers (HP and TP) that are respectively stored in the two memories 24 and 26.

The idle-address FIFO 22 stores the addresses of all empty cell positions in the cell pool 28. The credit manager 20 updates each VC's token based on the token generation rate, and determines which VC has credit to send cells.

Figures 9A, 9B, 9C:
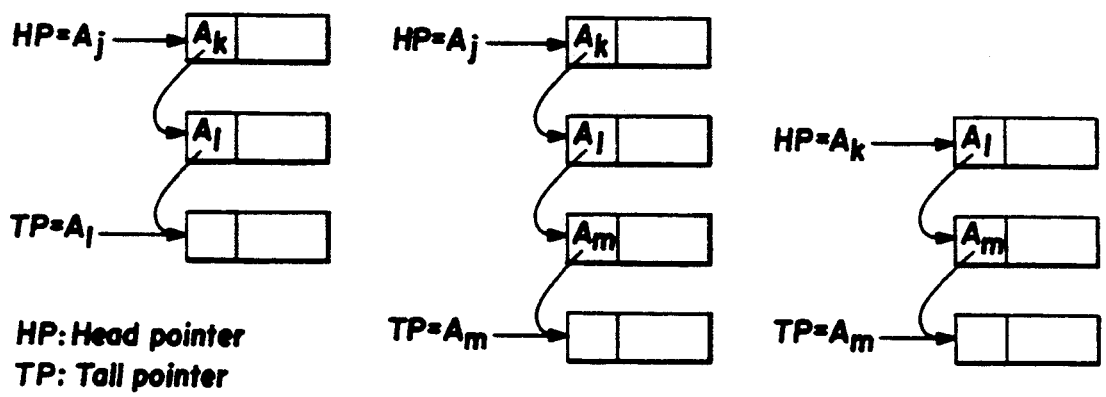
FIGS. 9a through 9c are schematic views illustrating linked pointers; they are updated when a cell is added to or deleted from a logical queue.

Cells in the same logical queue are linked by pointers that are attached with cells in the cell pool 28 as shown in FIG. 9. FIG. 9(b) shows how a newly arriving cell is added to a logical queue properly. The cell's VCI is extracted first and used as an address to read out the tail pointer from the TP memory (e.g. $A_i$). The tail pointer is then used as a writing address for the cell to be written into the pool. In the meantime, an idle address (e.g. $A_m$) attached to the cell will be written into the cell pool 28, which will also point to the queue's tail. The TP is then updated with the value of $A_m$. As the credit manager 20 determines a VC that has credit to send a cell, the operation of deleting a cell from the corresponding logical queue is shown in FIG. 9(c). The credit manager 20 reads out the head pointer (e.g. $A_j$) from the HP memory and uses it as a reading address to access the cell from the cell pool 28. Once the cell is read out, its pointer (e.g. $A_k$) will be written into the HP memory to update the old head pointer.

N CREDIT UNITS

Figure 10:
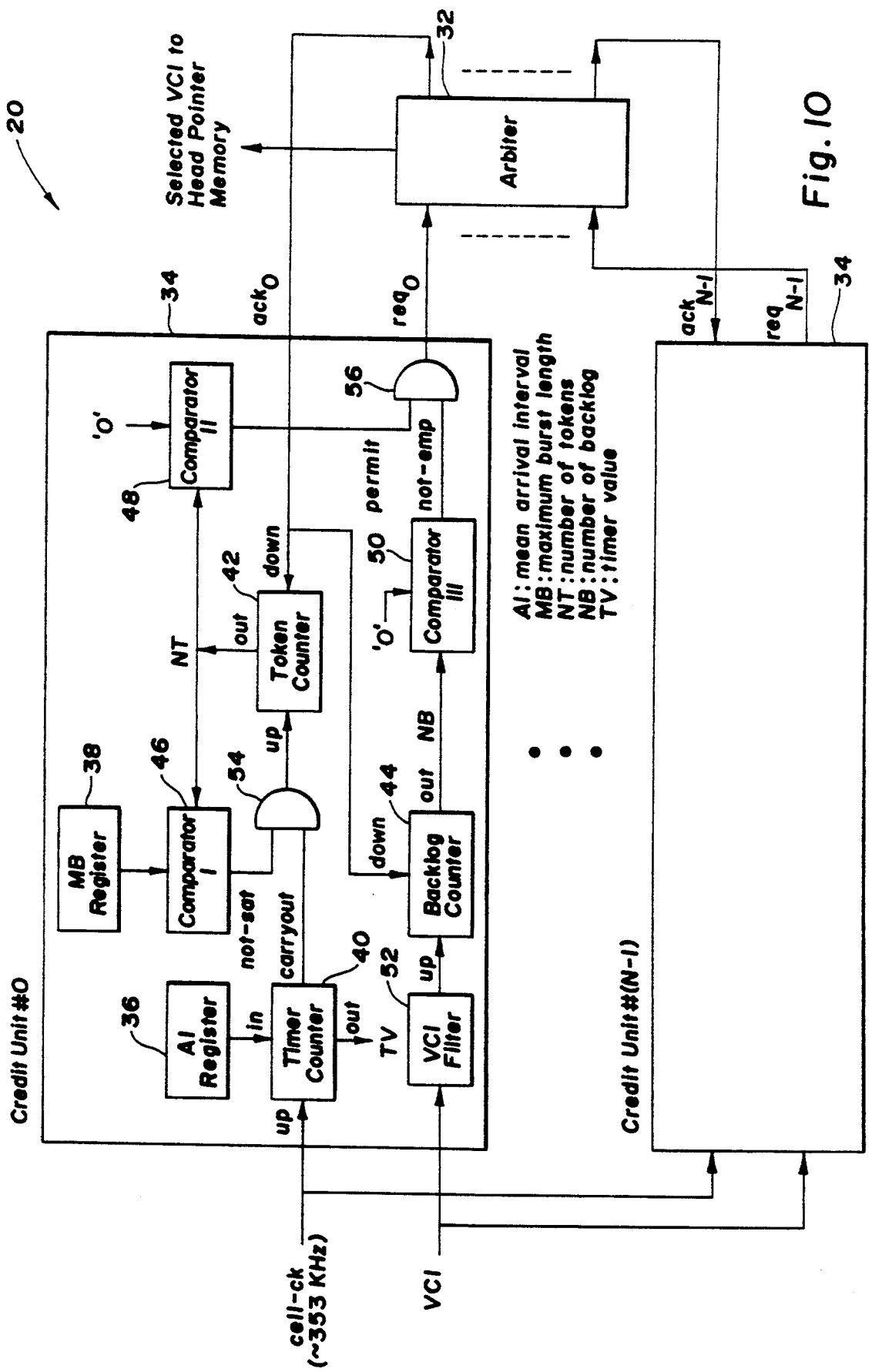
FIG. 10 is a credit manager block diagram of the first architecture; the credit manager consists of an arbiter and N credit units; each determines whether its associated VCI has credit to send out a cell.

FIG. 10 shows one possible way to implement the credit manager 20, which includes an arbiter 32 and N credit units 34; each determines whether its associated VC has enough credit to send out a cell. Inside each credit unit 34, there are two registers 36 and 38 to store mean arrival interval (AI) and maximum allowed burst length (MB), respectively, three counters 40, 42 and 44, four comparators 46, 48 and 50 (including the one in the VCI filter 52), and a couple of gates 54 and 56.

As soon as the VC has non-zero credit (i.e. the number of tokens is greater than zero) and there are cells waiting in the logical queue, a request signal (req$_i$) will be sent to the arbiter 32. The arbiter 32 will, in each cell time slot, select at most one of them (if there is any) in a round-robin sequence to achieve fairness. The grantee will be acknowledged with an ack$_i$ signal and allowed to transmit a cell to the ATM network. The implementation of an arbiter has been suggested by many researchers.

In addition to sending the acknowledgement to the credit units 34, the arbiter 32 will also decode the ack$_i$ signal into the corresponding VCI to the HP memory, from which the starting address of the associated logical queue is read and then used as an address to access the cell in the cell pool 28.

The operation of each credit unit 34 is described as follows. As a virtual channel connection is admitted to the ATM network, its AI and MB values are stored in the registers, 36 and 38, respectively. The token counter 42 is loaded with the MB value, and the VCI filter 52 is loaded with a new VCI value. Upon a cell arrival, its VCI value is broadcast to each credit unit's VCI filter 52. If the VCI is matched, its backlog counter 44 will be incremented by one, whose output value reflects the current number of backlog cells in the cell pool 28.

The backlog counter 44 is decremented by one as soon as a cell is transmitted to the network. The timer counter 40 is loaded with the AI value initially and decremented by the cell-ck signal (about 353 kHz). As the timer output value (TV) reaches zero, the carryout signal is asserted and the timer counter 40 is loaded with the original AI value again. This carryout signal will increase the token counter 42 by one if its output value, number of tokens (NT), has not reached the MB value yet, i.e. the not-sat signal is logically true.

However, if the NT is equal to the MB, the carryout signal will be masked by the not-sat signal and so the token counter 42 will not be incremented. If the NT is not zero, which means the VC has credit, the permit signal will be asserted. Combined with the notemp, indicating that the number of backlog cells is not zero, the request signal, req$_i$, is asserted and sent to the arbiter 32. Once the request has been acknowledged by its ack$_i$, the token and backlong counters 42 and 44, respectively, both will be decremented by one.

SINGLE CREDIT UNIT

The architecture of the credit manager 20 shown in FIG. 10 is relatively straightforward; i.e. each VC has a credit unit associated with it. However, if the number of the active VCs (N) on the incoming channel is large (e.g. 2K), the amount of hardware grows tremendously and it is no longer cost effective. If the number of active VCs is not too large (e.g. 128), the architecture can be simplified to the one shown in FIG. 11, which replaces the N credit units 34 of FIG. 10 with a memory 58 and a single credit unit 60. Both the register data (AI and MB) and the temporary values of three counters (NT, TV and NB) for each VC are stored in the memory 58, whose entry could be addressed by the VCI. The frequency of the cell-ck' signal is N times that of the cell-ck, because the single credit unit 60 has to complete the token updating/checking for all N VCs in one cell time slot (about 2.83 μs).

The operation of the single credit unit 60 is identical to the one discussed previously except that the intermediate values are not stored in registers or counters but in the memory 58. In each cell time slot, this could involve 2N memory accesses, one read and one write for each VC. This may become the system's speed bottleneck if N is too large. But, for a small N, for example N=128, it requires a memory cycle time of less than 11 ns (2.83 μs/256), which is achievable with state-of-the-art memories. Since the number of active VCs in each incoming channel is much smaller than the range of the VCI (64K), content addressable memory (CAM) may be utilized to store these intermediate values, although the CAM's speed is typically much slower than that of a regular RAM (e.g. 100 ns vs. 9 ns).

PROPOSED ARCHITECTURE/ALGORITHM FOR LARGE NUMBER OF VIRTUAL CHANNELS

From the above discussion, the first architecture's hardware increases linearly with N and will not be cost effective for large N, while the second one can only handle a value of N up to about 128. A third architecture that can handle large N (e.g. up to thousands) is now described. In addition, the hardware complexity does not grow linearly with N.

Figure 11:
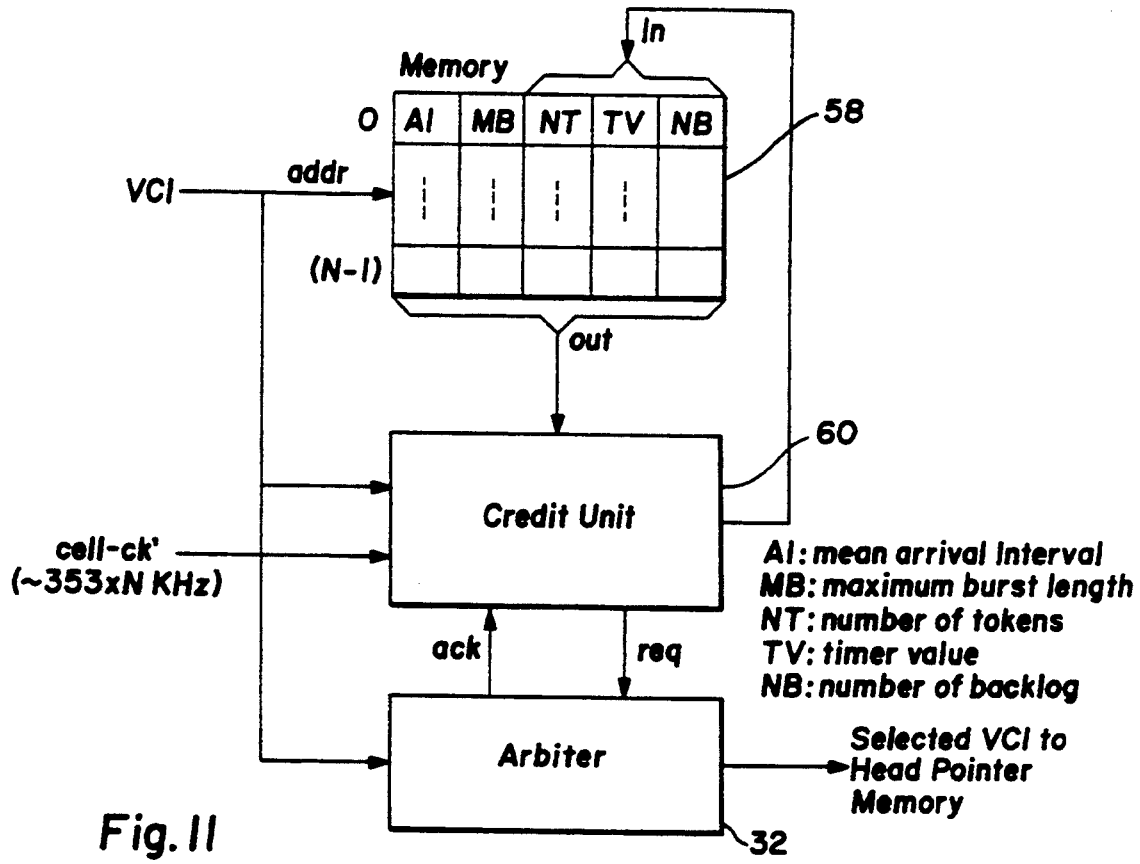
FIG. 11 is a credit manager block diagram of the second architecture of the present invention; N credit units is replaced with a memory and a single credit unit.
Figure 12:
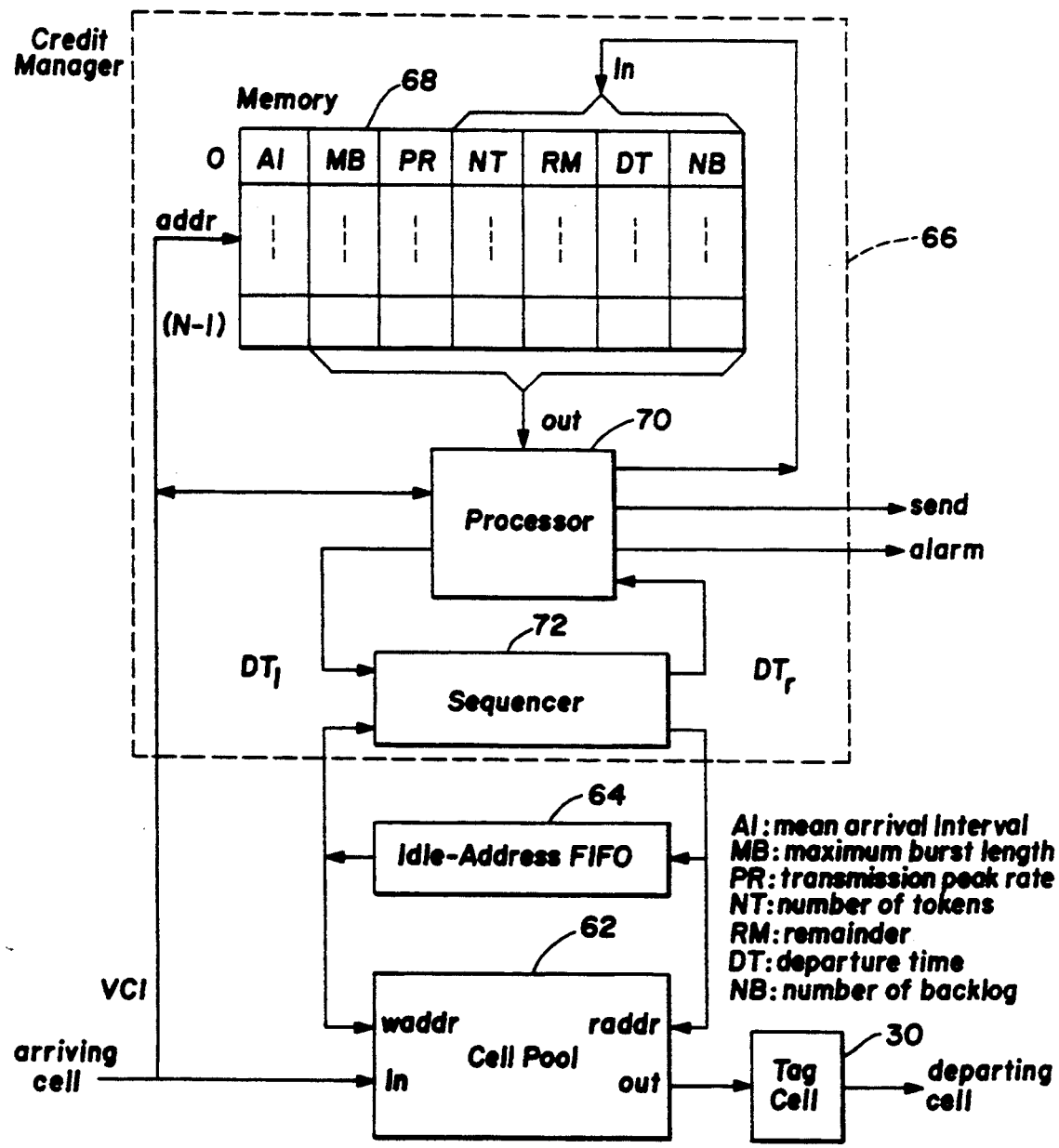
FIG. 12 is a block diagram of the third architecture of the present invention; the credit manager consists of a memory, a processor and a sequencer, which arranges cells' departure times in an ascending order.

FIG. 12 shows the architecture, which consists of a cell pool 62, an idle-address FIFO 64 and a credit manager 66, which, in turn, includes a memory 68, a processor 70 and a sequencer 72. The processor 70 and the sequencer 72 replace the credit unit 60 and the arbiter 32 in FIG. 11.

The basic idea of performing credit management is to keep a real-time clock and assign a departure time for every arriving cell. This concept was mentioned by L. Zhang in her paper entitled "Virtual Clock: A New Traffic Control Algorithm For Packet Switching Networks" in SIGCOMM' 90, Philadelphia, Pa., pp. 19-29, September 1990. However, the conditions and the ways of assigning the departure times presented herein are substantially different.

Based on the current credit, a departure time equal to the real-time or a larger value is assigned to the arriving cell. All these departure times will be stored in the sequencer 72 in ascending order. As the real-time clock ticks, the processor 70 accesses the smallest value of departure time from the right-most port of the sequencer 72 and compares it to the real-time value. If they are equal, meaning that the departure time is expired, its corresponding cell stored in the cell pool 62 will be accessed and sent out.

The architecture is not restricted by the number of VCs on the incoming channel nor the size of the cell pool 62. Only when a cell arrives will the processor 70 assign a departure time to it. With the assistance of the sequencer 72, the processor 70 will only need to check the departure time once in each cell time slot and this will not become the system's bottleneck. The size of memory 68 and the sequencer 72 may increase linearly but not significantly because the incremental amount for each extra VC is very small. As shown in FIG. 11, all the initial and intermediate values are stored in the memory 68 rather than registers to reduce cost.

Each entry in the sequencer 72 has two values; one is the cell's departure time and the other is the cell's physical address in the cell pool 62. As the departure time becomes equal to the real-time, the address will be used to read out the cell in the cell pool 62.

Figure 13A:
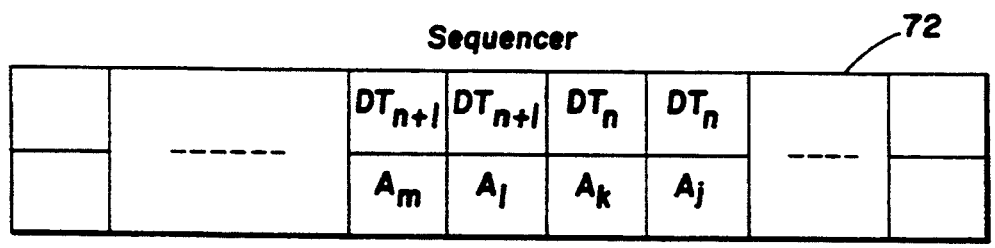
FIGS. 13a and 13b are schematic views of the operation of the sequencer; a new pair of departure times and addresses are inserted and all pairs with larger departure times are pushed to the left.
Figure 13B:
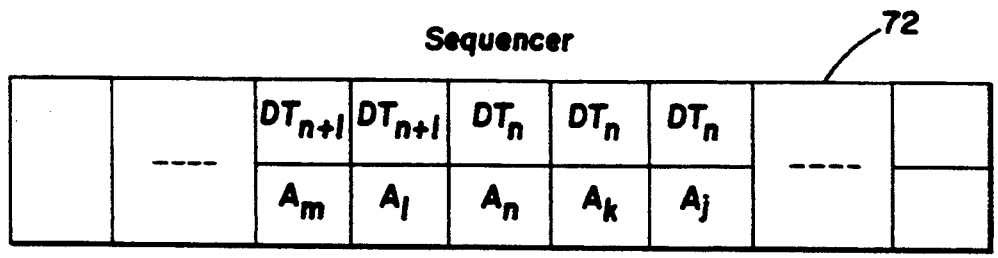

The concept of implementing the sequencer 72 is very simple and is illustrated in FIGS. 13a and 13b. Assume that the value of $DT_n$ is less than that of $DT_{n+1}$. When a new cell with departure time $DT_n$ arrives, all pairs on the right of $A_k$, including the $A_k$ itself remain at their positions while others are shifted to the left and the vacant position will be inserted with the pair of the new cell's departure time ($DT_n$) and address ($A_n$). The detail designs of the VLSI sequencer chip can be found in the above noted patent application entitled "Sequencer Chip Device."

ALGORITHM DESCRIPTION

An algorithm performed by the processor 70 for each VC to update/check the number of tokens and departure time is described below. Steps 1 to 5 are executed upon each cell arrival, while step 6 is executed once every cell time slot.

1. When a valid cell arrives, if the cell pool 62 is full (or the idle-address FIFO 64 is empty), the address field of the right-most port of the sequencer 72 will be used to read out the corresponding cell in the cell pool 62, whether or not the departure time has been reached. The accessed cell will be tagged with lower priority and transmitted to the network. Each cell stored in the cell pool 62 has a field containing its $VCI_i$ value (or the entry address in the memory 68). Thus, as the cell is read out from the cell pool 62, this $VCI_i$ or entry address can be used to update the number of backlog cells, or $NB_i = NB_i - 1$.
2. Store the newly arriving cell in the cell pool 62.
3. Update the number of token ($NT_i$) and the remainder ($RM_i$), which keeps track of the fraction of a token:

$$NT_i = \min\left(MB_i, NT_i + \max\left(0, \left[\frac{RT + RM_i - DT_i}{AI_i}\right]\right)\right)$$

$$RM_i = \max(0, (RT + RM_i - DT_i) \% AI_i)$$

where "min" and "max" are the functions to choose the minimum or the maximum from the arguments, [] is the integer truncation operation, and "%" is an operation to calculate the remainder. Initially, $NT_i$ is set to $MB_i$ and $RM_i$ is set to zero.

4. Assign the departure time to the newly arriving cell:
   i. If $NT_i > 0$, then $DT_i = \max(RT, DT_i + 1/PR_i)$, $NT_i = NT_i - 1$, and $NB_i = NB_i + 1$.
   ii. If $NT_i = 0$, then $DT_i = DT_i + AI_i - RM_i$, $RM_i = 0$, and $NB_i = NB_i + 1$.

where $PR_i$ is the allowed transmission peak rate for $VCI_i$. The $DT_i$ is initially assigned to $-\infty$.

5. If $NB_i$ is greater than a backlog threshold ($BT_i$), which means that too many violated cells are stored in the buffer (cell pool 62), an alarm will be sent back to the source of this connection to slow it down, or simply discarding its following cells.
6. If the departure time of the right most port of the sequencer 72 is equal to the real-time (RT), then shift all the data in the sequencer 72 to the right by one position. The address field will be used to read out the cell in the cell pool 62. In the mean time, $NB_i = NB_i - 1$.

From step one, it is noted that the tagged cell, which is sent out because the cell pool 62 is full, may not belong to the connection that has the most backlog cells in the cell pool 62 and should not be tagged with lower priority. However, since there is a backlong threshold (BT) for each connection, other connections can be protected by sending an alarm to the source that has too large a backlog or discarding its following cells. Besides, tagging only happens when the cell pool 62 is full and its probability is low if the pool size is large and the traffic is not too bursty. For instance, with the mean burst length of 60 cells (period=3 cells) and a 256-cell buffer, the percentage that the buffer is full is less than 6%. Furthermore, the occurrence of tagging cells is random to all connections and thus is somewhat fair. Also, the newly arriving cell cannot be tagged when the cell pool 62 is full. Otherwise, cells may be delivered out of sequence at the receive end because there may be some earlier arrived cells that are stored in the buffer and still waiting for their departure times to expire. In each cell time slot, the operations may include two memory accesses, one integer division and a few comparisons to check for the token number and departure time. All these have to be completed in 2.83 μs, an achievable value with today's hardware technologies.

The "time roll-over" problem, when the real-time clock or departure time exceeds its maximum value, can be resolved by using two parallel sequencers to store two different banks of departure times. Whenever the DT value exceeds its maximum value, its most significant bit will be truncated and the remaining bits will be stored in another sequencer. Similarly, as the real-time clock rolls-over, the cells associated with the current sequencer will have been transmitted completely because the values of all departure times, when they are assigned, are always greater than or equal to the real-time value. Once the roll-over happens, another sequencer will then start being served.

EXAMPLE

The above algorithm is illustrated and explained with an example. Let's assume that the mean arrival rate (AR) is 0.1 cells per time slot (i.e. its mean inter-arrival interval (AI) is 10 cells), the maximum burst length is 3 cells and the maximum transmission peak rate is 0.2 cells per time slot (i.e. its minimum inter-departure interval is 5 cells). A program has been written, based on the above algorithm, to calculate each arriving cell's departure time. The transitions of the intermediate values for 10 arrived cells are listed in the table below.

TABLE I

| Cell No. Arrived | RT | NT | RM | DT |
| --- | --- | --- | --- | --- |
| 1 | 0 | 3/2 | 0/0 | 0 |
| 2 | 3 | 2/1 | 3/3 | 5 |
| 3 | 5 | 1/0 | 3/3 | 10 |
| 4 | 9 | 0/0 | 2/0 | 18 |
| 5 | 22 | 0/0 | 4/0 | 24 |
| 6 | 26 | 0/0 | 2/0 | 32 |
| 7 | 28 | 0/0 | 0/0 | 42 |
| 8 | 84 | 3/2 | 2/2 | 84 |
| 9 | 88 | 2/1 | 6/6 | 89 |
| 10 | 96 | 2/1 | 3/3 | 96 |

The first number in the NT (RM) column is the token count (remainder) before the algorithm is executed and the second number is the one after the execution. Initially, the NT is assigned to the MB, which is equal to 3. The first three cells arrive at real-time (RT) 0,3,5. According to the 4(i) rule, since the NT is greater than zero, their DTs are assigned with times separated by the minimum cell departure interval (1/PR), 5 cells in this example. When the 4th cell arrives, there is no token left. So, based on the 4(ii) rule, its DT is assigned the value of (DT+AI−RM), or (10+10−2), or 18. It is noted that as the 7th cell arrives, its arrival time (28) is less than the previous cell's DT (32). The value of (RT+RM−DT) is less than zero and so the NT and RM are set to 0. When the 8th cell comes, the time elapsed since the last time that the previous cell's DT was assigned is more than 40 cell time slots. Although the accumulated credit is 4, NT is set to the maximum burst length (3).

CONCLUSION

Traffic enforcement is required to monitor each individual virtual connection and to ensure that its traffic flow into the network conforms to traffic parameters, such as average and peak bit rates, and maximum burst lengths, that are specified at call set-up time. If the connection does not conform to the parameters, actions will be taken to regulate the violated traffic. Depending on what enforcement action is taken and whether there is a "shaping" buffer, four different versions of leaky bucket schemes are described in this application and their cell loss performance is compared in conjunction with a statistical multiplexer. The one version in which violated cells are stored in the shaping buffer or tagged when the buffer is full performs the best in terms of the cell loss rate. However, properly scheduling and delivering the stored cells is not trivial and may become the system's bottlenecks. Designing a feasible and flexible architecture independent of the number of the virtual connections or the buffer size is challenging. Three architectures have been described. Among them, a novel algorithm and its implementation method have been proposed to accommodate a large number of virtual connections on each incoming STS-3c channel. To support the architecture, a VLSI chip (called a sequencer 72), containing about 150K CMOS transistors, has been implemented in a regular structure such that the shaping buffer size and the number of virtual connections can grow flexibly to a large value.

While the best mode for carrying out the invention has been described in detail, those familiar with the art to which this invention relates will recognize various alternative designs and embodiments for practicing the invention as defined by the following claims.

What is claimed is:

1. A method for controlling user traffic to a fast packet switching system, each of the packets originating at a source of packets and having a virtual channel identifier (VCI), the method comprising the steps of:
   receiving the packets, each of the packets having associated therewith an arrival time;
   storing each of the received packets at an addressable location in a first memory, the first memory having a plurality of addressable locations;
   storing in a second memory addresses corresponding to the addressable locations in the first memory in which a packet not yet stored, the addresses stored in the second memory being utilized in the step of storing the received packets;
   linking packets having the same VCI in a queue in the first memory
   determining whether a particular queue of linked packets complies with the predetermined traffic parameters to obtain validated queue of linked packets;
   retrieving the first validated packet in queue from the first memory; and
   transmitting the retrieved packet to the packet switching system.

2. The method as claimed in claim 1 further comprising the step of tagging the retrieved packet when the first memory is full wherein the tagged packet is transmitted to the packet switching system.

3. The method of claim 2 wherein each of the queues has a head pointer and a tail pointer associated therewith and wherein the method further comprises the steps of storing the head and tail pointers in respective third and fourth memories.

4. A system for controlling user traffic to a fast packet switching system, each of the packets originating at a source of packets and having a virtual channel identifier (VCI), the system comprising:
   means for receiving the packets, each of the packets, each of the packets having associated therewith an arrival time;
   a first memory means coupled to the means for receiving for storing each of the received packets at an addressable location, the first memory means having a plurality of addressable locations;
   a second memory means coupled to the first memory means for storing addresses corresponding to the addressable locations in the first memory means in which a pocket is not yet stored, the addresses stored in the second memory means being utilized to store the received packets;
   credit manager means coupled to the means for receiving and to the second memory means for determine whether a stored packet complies with predetermined traffic parameters including average arrival rate and mean burst rate based on its arrival time and its VCI to obtain a validated packet and for retrieving the validated packet from the first memory means;
   means for linking packets having the same VCI in a queue in the first memory means and wherein the credit manager means determines whether a particular queue of linked packets complies with the predetermined traffic parameters to obtain a validated queue of linked packets; and
   means for transmitting the retrieved packet to the packet switching system.

5. The system as claimed in claim 4 further comprising means for tagging the retrieved packet when the first memory means in full wherein the tagged packet is transmitted to the packet switching system.

6. The system of claim 5 wherein each of the queues has a head pointer and a tail pointer associated therewith and wherein the second memory means includes first and second memories for storing the head and tail pointers, respectively.

7. A system for controlling user traffic to a fast packet switching system, each of the packets originating at a source of packets and having a virtual channel identifier (VCI), the system, comprising:
   means for receiving the packets, each of the packets, each of the packets having associated therewith an arrival time;
   a first memory means coupled to the means for receiving for storing each of the received packets at an addressable location, the first memory means having a plurality of addressable locations;
   a second memory means coupled to the first memory means for storing addresses corresponding to the addressable locations in the first memory means in which a packet is not yet stored, the addresses stored in the second memory means being utilized to store the received packets;
   credit manager means coupled to the means for receiving and to the second memory means for determine whether a stored packet complies with predetermined traffic parameters including average arrival rate and mean burst rate based on its arrival time and its VCI to obtain a validated packet and for retrieving the validated packet from the first memory means, wherein the credit manager means includes forth memory means for storing a value corresponding to mean arrival interval associated with each packet and wherein the mean arrival interval is utilized by the credit manager means in determining a validated packet, wherein the fourth memory means further stores a maximum allowed burst length associated with each packet and wherein the maximum allowed burst length is utilized by the credit manager means in determining a validated packet and wherein the credit manager means also includes an arbiter means and at least one credit unit means coupled to the arbiter means; and
   means for transmitting the retrieved packet to the packet switching system.

8. The system of claim 7 wherein the credit manager means further includes a plurality of credit unit means coupled to the arbiter means, a plurality of credit unit means having the forth memory means.

9. The system of claim 7 wherein the forth memory means is coupled to the at least one credit unit means.

10. A system for controlling user traffic to a fast packet switching system, each of the packets originating at a source of packets and having a virtual channel identifier (VCI), the system, comprising:
   means for receiving the packets, each of the packets having associated therewith an arrival time;
   a first memory means coupled to the means for receiving for storing each of the received packets at an addressable location, the first memory means having a plurality of addressable locations;
   a second memory means coupled to the first memory means for storing addresses corresponding to the addressable locations in the first memory means in which a packet is not yet stored, the addresses stored in the second memory means being utilized to store the received packets;

credit manager means coupled to the means for receiving and to the second memory means for determine whether a stored packet complies with predetermined traffic parameters including average arrival rate and mean burst rate based on its arrival time and its VCI to obtain a validated packet and for retrieving the validated packet from the first memory means, wherein the credit manager means includes forth memory means for storing a value corresponding to mean arrival interval associated with each packet and wherein the mean arrival interval is utilized by the credit manager means in determining a validated packet, wherein the fourth memory means further stores a maximum allowed burst length associated with each packet and wherein the maximum allowed burst length is utilized by the credit manager means in determining a validated packet and wherein the credit manager means includes processor means coupled to the forth memory means and a sequencer means coupled to the processor means for storing a departure time for each of the stored packets, the processor means comparing the smallest departure time with a real-time value; and means for transmitting the retrieved packet to the packet switching system.

* * * * *